3,396,595
WORM AND WORM-WHEEL TRANSMISSIONS
Gustav Niemann, 39 Flemingstrasse,
8 Munich 27, Germany
Filed Aug. 30, 1966, Ser. No. 576,065
Claims priority, application Germany, Aug. 31, 1965,
N 27,271
7 Claims. (Cl. 74—425)

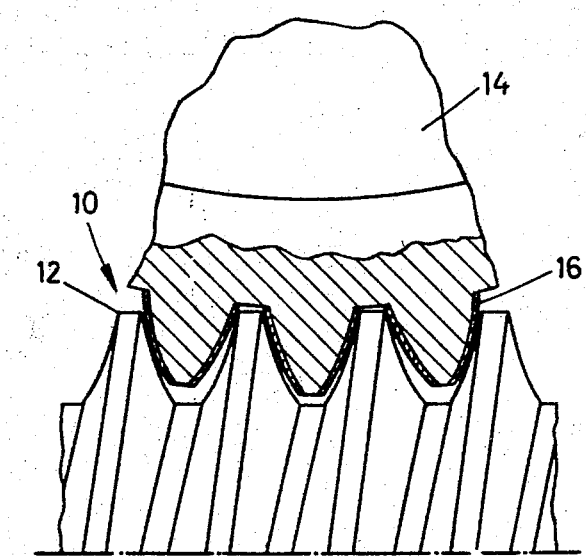

ABSTRACT OF THE DISCLOSURE

A worm and worm-wheel transmission. The transmission includes a rotary worm means and a rotary worm-wheel means coacting therewith, the worm means being made of hardened steel while the worm-wheel means is made of cast iron which initially is provided at its teeth with a relatively thin, scuff-preventing surface layer of a material softer than the material of the worm-wheel means. During running in of the worm and worm-wheel means, the relatively thin scuff-preventing surface layer of material which is softer than the material of the worm-wheel means becomes worn away at the load-transmitting surface portions of the teeth so that at these latter portions the hardened steel coacts directly with the cast iron of the worm-wheel means, which, because of this running in, has an exceedingly smooth surface coacting in a highly efficient manner with the worm means. This cast iron worm-wheel means has great resistance to wear and pitting and great strength, far beyond conventional bronze wheels, so that the load transmitting capacity of the transmission of the invention is greater than that of a comparable size where the worm-wheel is made of bronze. Of course, the relatively thin soft coating remains at the non-load carrying portions of the teeth of the worm-wheel.

---

The present invention relates to transmissions.

In particular, the present invention relates to worm-and-worm-wheel transmissions where a worm, which may be tapered or which may be of constant diameter, coacts with a worm-wheel for the purpose of transmitting relatively large loads.

With conventional worm-and-worm-wheel transmissions designed for the transmission of large loads, the worm is made of hardened steel and has ground tooth surfaces, and a worm-wheel of bronze coacts with this worm, because such a pair of transmitting elements has been found to have the greatest load-transmitting capability. There are known transmissions of this type where the worm is made of hardened steel and has ground tooth surfaces, while the worm-wheel is made of cast iron, and such a transmission presents the advantage of being less expensive than a transmission where the worm-wheel is made of bronze. However, the greater strength of the cast iron renders the running-in of the transmission more difficult to carry out, which is to say the adapting of the tooth surfaces of the worm-wheel to the tooth surfaces of the worm. Moreover, the greater strength of the cast iron used for the worm-wheel easily results in scratching and roughening or even scuffing of the tooth surfaces of the worm, and therefore the efficiency of the transmission is reduced and visible damaging of the transmission is apparent. As a result, worm-and-worm-wheel transmissions which include a worm-wheel made of cast iron have an extremely low load-transmitting capability and a low efficiency, as compared to a transmission where the worm-wheel is made of bronze. Thus, transmissions where a worm of hardened steel coacts with a worm-wheel of cast iron are used only for transmissions which are loaded to a small extent and/or are operated with relatively slow speeds of sliding movement between their tooth surfaces.

It is a primary object of the present invention to provide a worm-and-worm-wheel transmission capable of transmitting large loads and having an even greater load-transmitting capacity than a transmission where the worm is made of hardened steel and the worm-wheel is made of bronze, so that larger loads can be transmitted with the transmission of the present invention than with conventional transmissions of the same size.

The invention is illustrated by way of example in the accompanying drawing which forms part of this application and in which a transmission according to the present invention is fragmentarily illustrated in a partly sectional view with the plane of the section taken normal to the axis of the worm-wheel.

Referring now to the drawing, it will be seen that the transmission 10 of the present invention, which is illustrated therein, includes a rotary worm means 12 made of hardened steel and having ground tooth surfaces. This worm means 12 coacts with a worm-wheel means 14 made of cast iron, and in accordance with the present invention the tooth surfaces of the worm-wheel means 14 have been provided with a relatively thin damage-preventing surface layer 16 being softer than the material of which the worm-wheel means 14 is made, so that the material of the surface layer 16 is in fact softer than cast iron, in the illustrated example.

The surface layer 16 can be provided on the worm-wheel means 14 by phosphate treatment as well as by cadmium-plating, by tinning, or by copper-plating, so that the material of the surface layer 16 will be phosphates, cadmium, tin, or copper. However, the invention is not limited to these specific surface layers, since it is only required that the material of the surface layer 16 be softer than that of the worm-wheel 14 so as to prevent damaging or scuffing of the ground surface of the hardened steel worm 12 during running in, as pointed out above.

A transmission according to the present invention will run in just as fast and just as reliably, up to transmission of its rated load, as a transmission where the worm-wheel is made of bronze. Furthermore, with respect to efficiency or loss of output, the transmission of the invention is practically of the same high quality as a transmission where the worm-wheel is made of bronze. Because of the greater resistance to wear and pitting of a worm-wheel made of cast iron and because of the greater strength of the cast iron, it is possible to achieve with the transmission of the invention, however, a substantially greater load-transmission, at the load-carrying surfaces where the thin coating has worn away during running in, than is possible with a transmission of comparable size where the worm-wheel is made of bronze.

By providing in cooperation with a worm made of hardened steel a worm-wheel made of cast iron, the combination of the present invention achieves at the load-carrying tooth surfaces of steel and cast iron of the transmission load-transmitting capacities which up to the present time have been unknown in high-power worm-and-worm-wheel transmissions. Moreover, a transmission according to the present invention is more insensitive to overloads than a transmission of comparable size where the worm-wheel is made of bronze. For the relatively short periods of time, the transmission of the invention can be overloaded up to 250%, without, as has been known to happen with bronze worm-wheels, deformation of the teeth of the worm-wheel with resulting damaging of the transmission. In addition, the high-power worm-and-worm-wheel transmission according to the present invention exhibits, as compared to a conventional high-power transmission which includes a bronze worm-wheel, a far smaller sliding wear resulting from slippage between the tooth surfaces.

In addition to all of these advantages, the material and manufacturing costs for a transmission where the worm-wheel is made of cast iron is but a fraction of the material and manufacturing costs of a transmission where the worm-wheel is made of bronze.

The best operating conditions are achieved with the transmission of the invention, as is known per se for other high-power transmissions, where a lubricant is used in the transmission which includes a scuffing-preventing additive. Thus, in a transmission of the present invention it is preferred to use a lubricant having as additive one or more chloro-, phosphor-, lead-, or sulfur-compounds, so that the lubricant which forms part of the transmission of the invention will render even more reliable the prevention of scuffing of the worm.

It is of particular interest to apply the invention on a transmission where the worm has concave load-transmitting surfaces, as indicated in the drawing, since with such surfaces the Hertzian pressure and also the tendency of scuffing of the tooth surfaces of the transmission, in the pairing of cast iron and steel, are at a minimum. Therefore, the application of the features of the present invention to the construction of transmissions of this latter type provides the greatest possible increase in load-transmitting capacity and efficiency.

What is claimed is:

1. A transmission comprising rotary worm means and rotary worm-wheel means coacting with said rotary worm means, said worm means and said worm-wheel means being respectively made of materials which are prone to cause damage or scuffing of said worm means by said worm-wheel means, and said worm-wheel means having tooth surfaces directly coacting with said worm means, said tooth surfaces of said worm-wheel means having at non-loading carrying portions a relatively thin, scuffing-preventing surface layer of a material softer than said material of said worm-wheel means and thin enough to be worn away during running in so that the load is transmitted between load-carrying surface portions where the material of said worm-wheel means is exposed through said surface layer of softer material for direct engagement with said worm means.

2. A transmission as recited in claim 1 and wherein said worm means is made of hardened steel and has ground surfaces with which said worm-wheel means coacts, said worm-wheel means being made of cast iron, and said surface layer consisting of a material softer than cast iron.

3. A transmission as recited in claim 2 and wherein said non-load-carrying portions of said tooth-surfaces of said worm-wheel means are cadmium-plated to be provided with said surface layer.

4. A transmission as recited in claim 2 and wherein said non-load-carrying portions of said tooth surfaces of said worm-wheel means are coated with tin (tinned) to be provided with said surface layer.

5. A transmission as recited in claim 2 and wherein said non-load-carrying portions of said tooth surfaces of said worm-wheel means are copper-plated to be provided with said surface layer.

6. A transmission as recited in claim 1 and wherein a lubricant coacts with said worm means and worm-wheel means, said lubricant including a scuffing preventing additive.

7. A transmission as recited in claim 1 and wherein said worm means has concave tooth surfaces coacting with said worm-wheel means.

References Cited

UNITED STATES PATENTS

| | | | |
|---|---|---|---|
| 1,316,270 | 9/1919 | Calkins | 74—460 |
| 1,393,886 | 10/1921 | Doty | 74—460 |
| 2,183,667 | 12/1939 | Buckendale. | |
| 2,266,377 | 12/1941 | Neely et al. | |

FOREIGN PATENTS

| | | |
|---|---|---|
| 440,786 | 1/1936 | Great Britain. |
| 715,462 | 9/1954 | Great Britain. |

FRED C. MATTERN, JR., *Primary Examiner.*

LEONARD H. GERIN, *Assistant Examiner.*